US007256346B2

(12) United States Patent
Walter

(10) Patent No.: US 7,256,346 B2
(45) Date of Patent: Aug. 14, 2007

(54) RAIL PROFILE AND PRESENTATION DEVICE PRODUCED THEREWITH

(75) Inventor: Herbert Walter, Müllheim (DE)

(73) Assignee: Visplay International, AG, Muttenz (CH)

( * ) Notice: Subject to any disclaimer, the term of this patent is extended or adjusted under 35 U.S.C. 154(b) by 0 days.

(21) Appl. No.: 10/564,570

(22) PCT Filed: Aug. 17, 2004

(86) PCT No.: PCT/CH2004/000515

§ 371 (c)(1),
(2), (4) Date: Jan. 13, 2006

(87) PCT Pub. No.: WO2005/027278

PCT Pub. Date: Mar. 24, 2005

(65) Prior Publication Data

US 2006/0207778 A1 Sep. 21, 2006

(30) Foreign Application Priority Data

Sep. 15, 2003 (DE) ........................... 203 14 260 U

(51) Int. Cl.
*H02G 3/04* (2006.01)

(52) U.S. Cl. .................... 174/68.1; 174/481; 174/68.3; 439/215; 52/36.6

(58) Field of Classification Search ................ 174/481, 174/50, 68.1, 68.3; 439/110, 111, 115, 215, 439/207, 208; 52/36.6, 127.9
See application file for complete search history.

(56) References Cited

U.S. PATENT DOCUMENTS 4,795,355 A 1/1989 Dorn et al.
4,973,796 A * 11/1990 Dougherty et al. ......... 174/495
2005/0082082 A1 4/2005 Walter et al.
2005/0082239 A1 4/2005 Laurösch et al.

FOREIGN PATENT DOCUMENTS

DE 201 00 181 U1 7/2001
DE 102 07 715 A1 9/2003
EP 0 007 071 A1 1/1980
WO WO 03/053192 A 7/2003
WO WO 03/070060 A1 8/2003

* cited by examiner

*Primary Examiner*—Dhiru R. Patel
(74) *Attorney, Agent, or Firm*—McCarter & English, LLP

(57) ABSTRACT

The rail profile (1,2) is provided for vertical inclusion in a support structure (9) with a function as a presentation device. A current rail (3) with a power supply is provided within the profile rail (1,2), with current conductors (35,36) partially embedded in an insulation profile. A passage running through the profile rail (1,2) from the front access thereto, runs all the way along the profile rail (1,2) and permits access for an adapter (4) to the current conductors (35,36) in freely selectable positions for the supply of a user (79), for example a lamp. In the assembled state, in principle, only the passage is visible from the front side (90) of the support structure (9). In a further embodiment of the profile rail (2), support arms (8) are included in the passage which serve for the direct hanging of objects, or for the retention of supports (7). Support structures (9) can, for example, be sales stands, rear, middle or dividing walls. For the construction of a complex arrangement, for example, a presentation wall, both versions of the profile rail (1,2) may be used adjacently. The profile rails (1,2) are advantageously produced as aluminium extruded profiles which may be cut to length for particular applications.

9 Claims, 14 Drawing Sheets

Fig. 1B
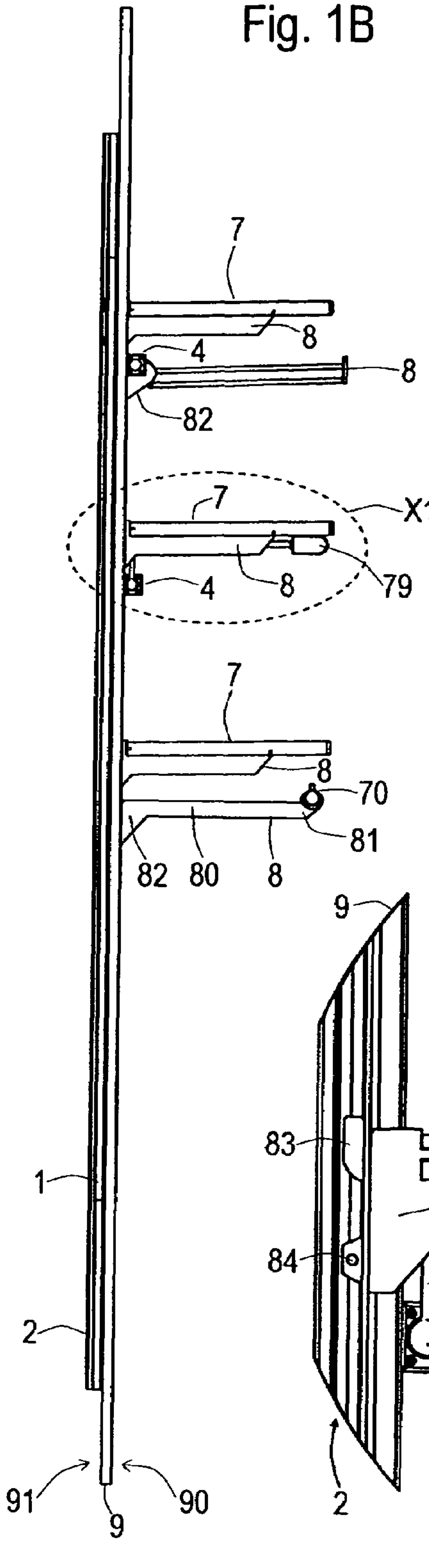
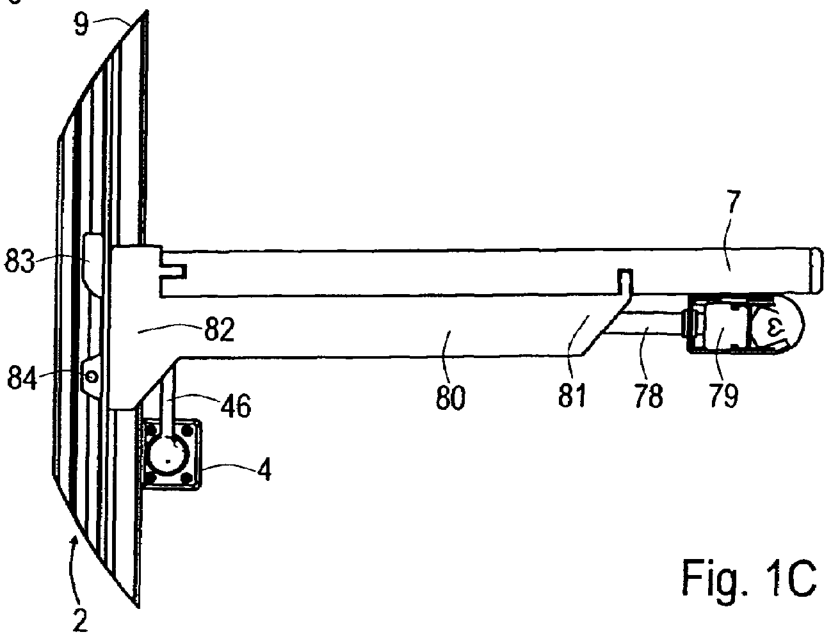
Fig. 1C

Fig. 3A
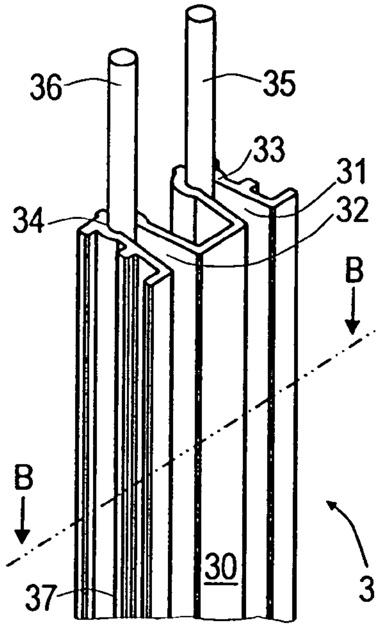
Fig. 3B
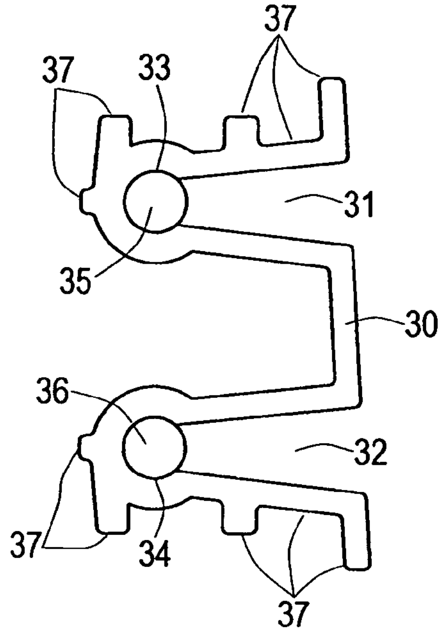
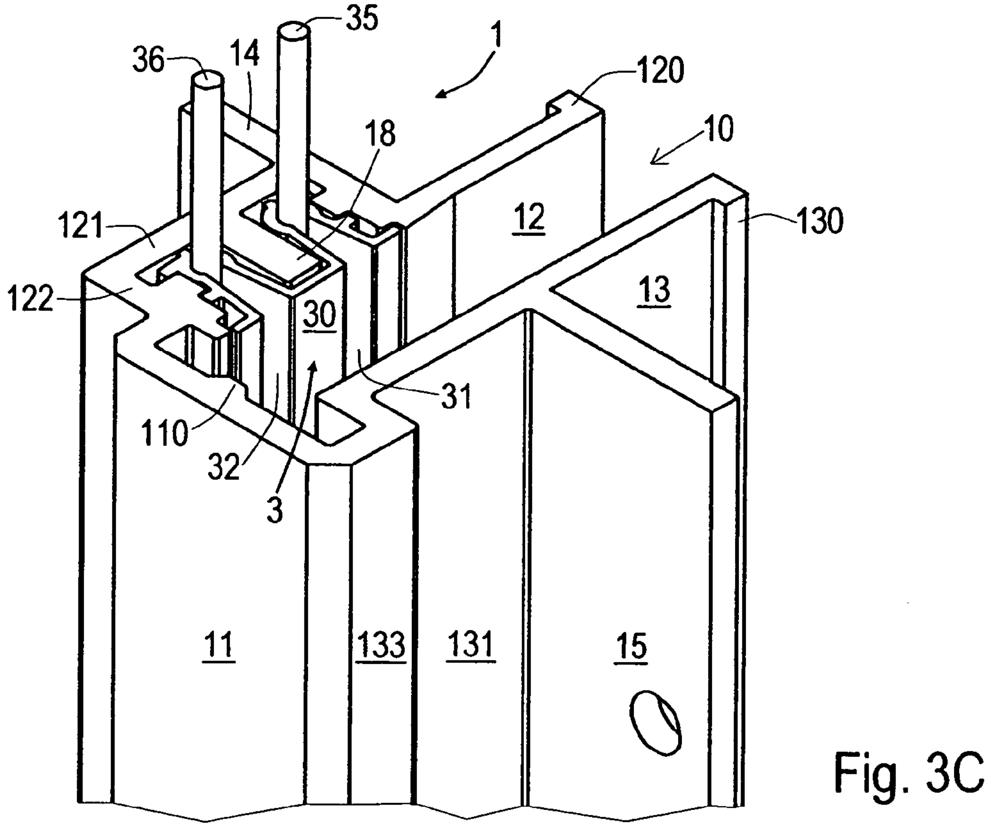
Fig. 3C

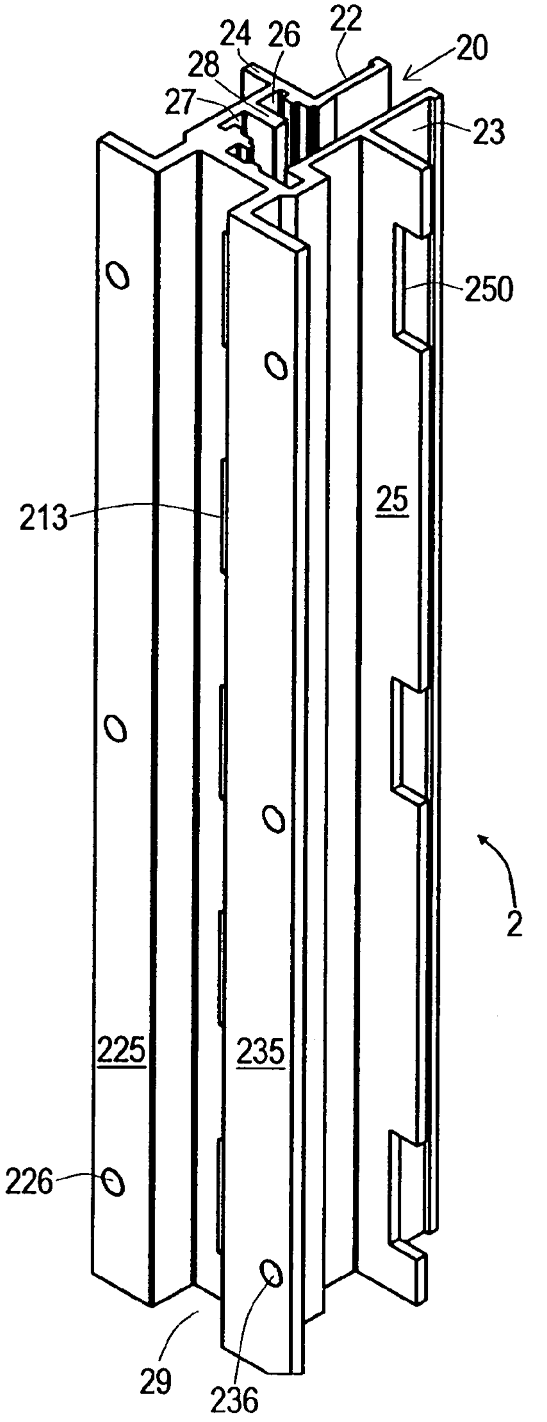
Fig. 4A
Fig. 4B
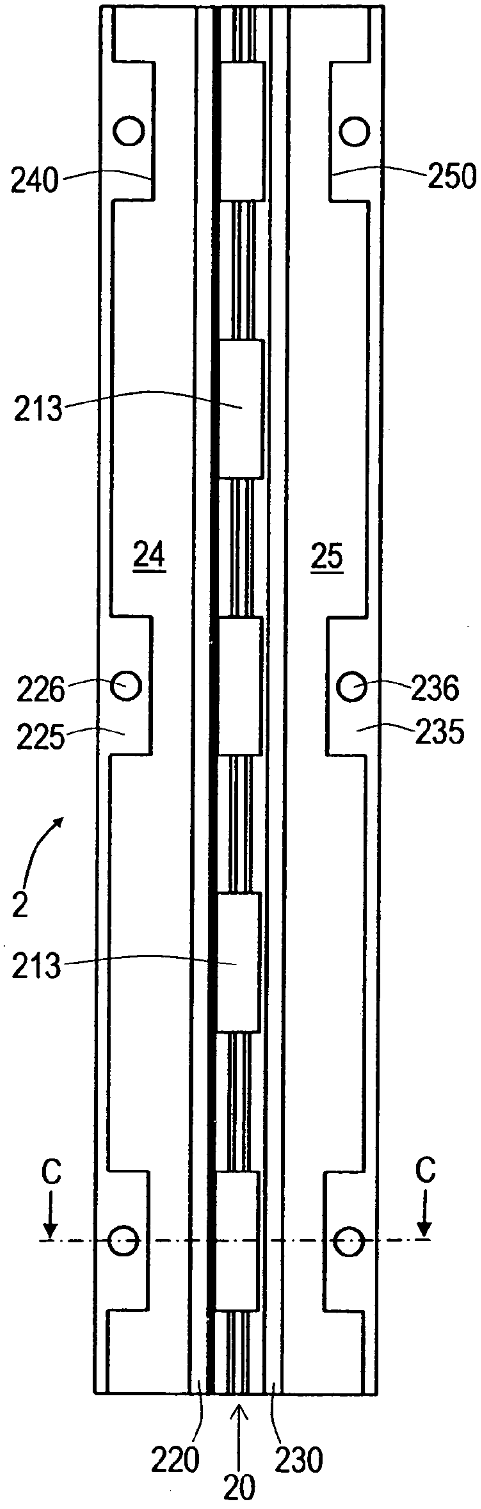

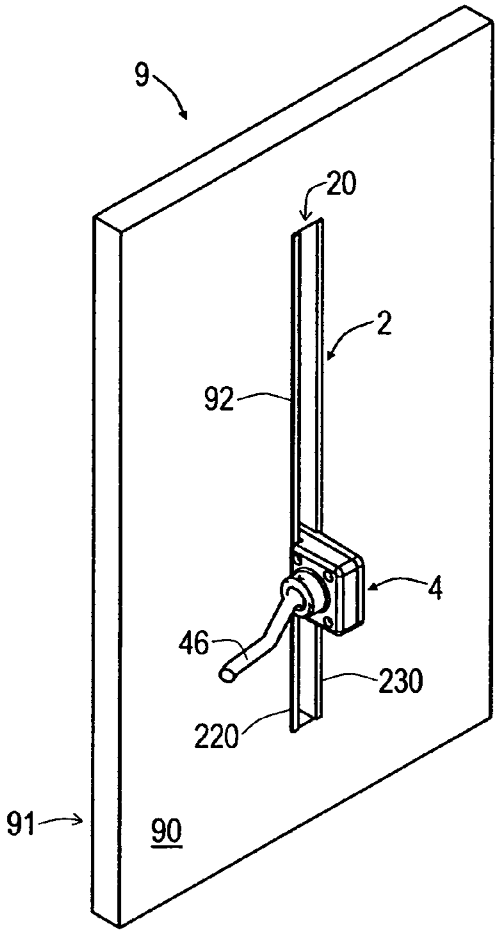
Fig. 8A
Fig. 8B
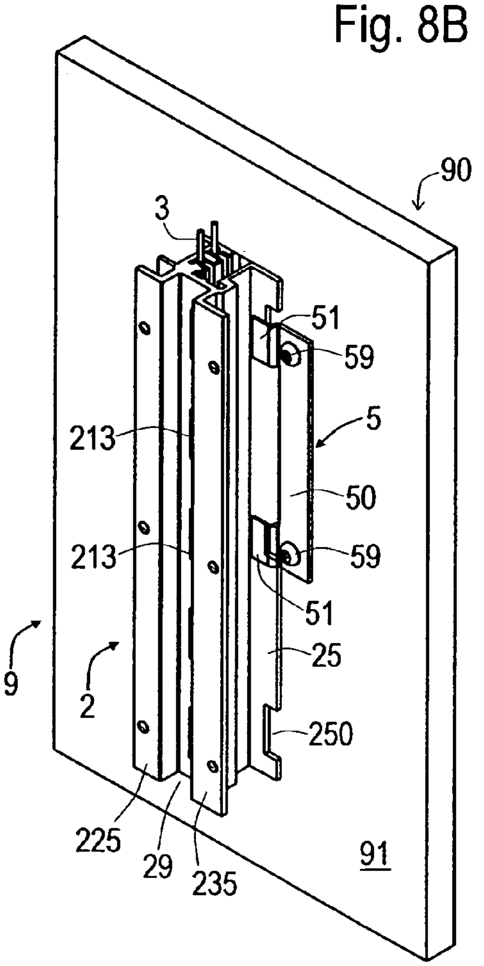

Fig. 9C
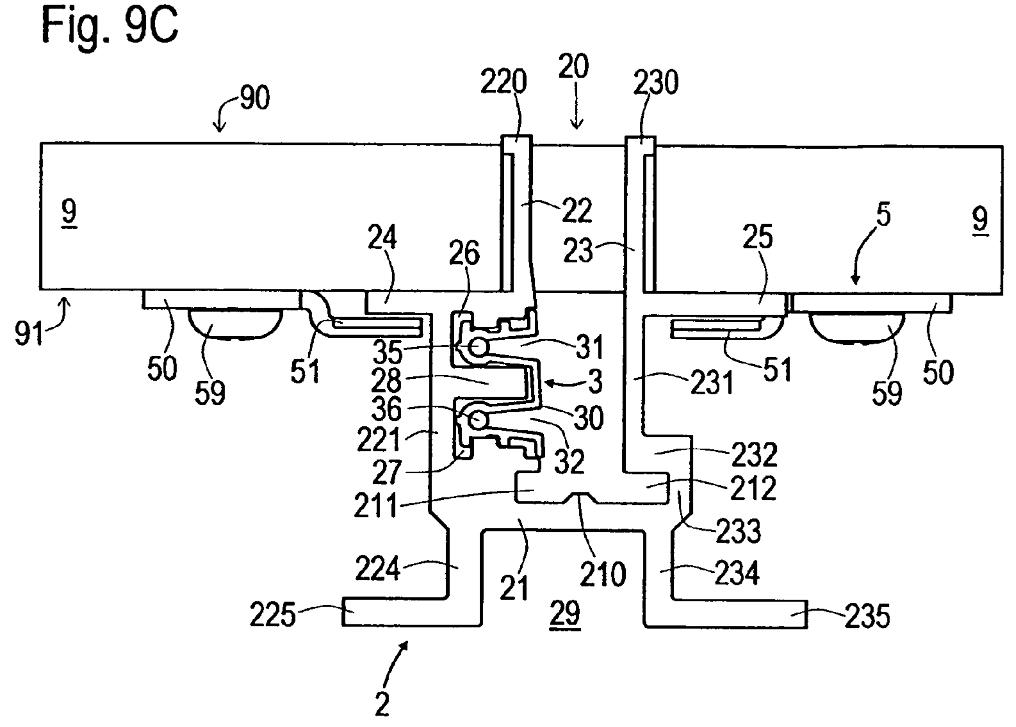
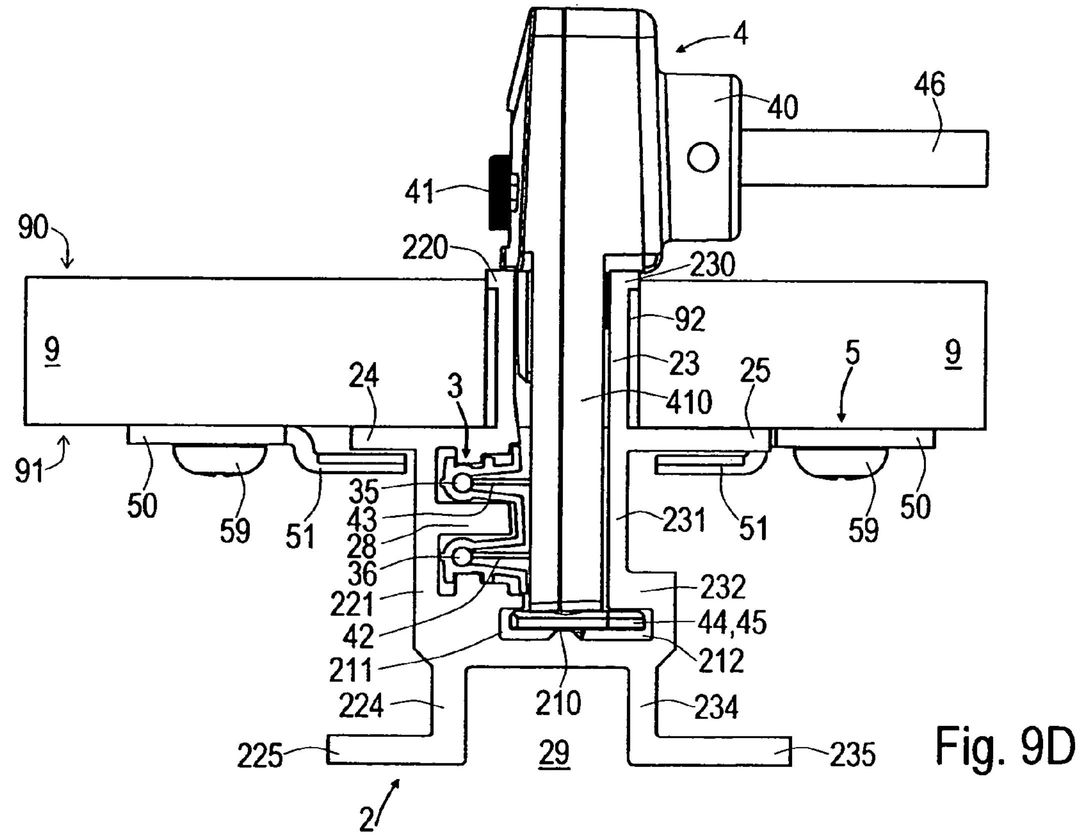
Fig. 9D

RAIL PROFILE AND PRESENTATION DEVICE PRODUCED THEREWITH

FIELD OF THE INVENTION

The invention relates to a rail profile which is to be fastened to a supporting structure and has a passage extending from the front side into the interior of the rail. The rail profile has arranged in it a conductor rail with current-carrying wires which are guided therein and are accessible from the passage for electrical tapping-off by means of an adaptor which can be plugged in. The adaptor which can be plugged in and displaced at any desired position along the rail profile is provided for supplying current to consumers which can be connected, in particular lights.

In an expanded embodiment of the rail profile, supporting arms can be inserted into the passage and serve for the direct hanging of objects or for securing, for example, supports in the form of bars, hangers, hooks or plates which receive the objects which are to be presented and/or stored. Suitable objects are, for example, goods which are to be presented, exhibits and articles of decoration or commercial or private sector articles to be stored. Supporting structures may be, for example, sales stands, rear walls, middle walls or dividing walls. In order to construct a more complex arrangement, for example for a presentation wall in a commercial installlation, both variants of the rail profiles can be used next to each other. The rail profiles are advantageously produced as aluminum extruded profiles which are cut to the required length for a specific use.

PRIOR ART

DE 201 00 181 U1 discloses a profile which is provided for the vertical arrangement and for the hooking-in of conventional brackets. Walls which in between form a channel with a vertically continuous entry slot taper toward the front side of the profile. A slotted grid for receiving the hook-in lugs of hooked-in brackets lies in the region of the rear side of the profile. This profile does not have an internal supply of current, and so the function is restricted solely to the securing of shelf elements.

WO 03/070 060 A1 describes a rail profile into which supports for hanging or depositing objects are inserted. This rail profile is intended to be fastened horizontally to a supporting structure; it has a passage extending horizontally from a front entry into the rail profile. It has arranged within it a conductor rail which is supplied via a power supply and has conductors which are accessible from the passage for electrical tapping-off in order to supply a consumer, which can be connected via a supply line. The rail profile shown therein is provided only for horizontal installation and therefore does not permit any positioning of supports for goods at a selectable height.

EP 0 007 071 A1 has a holding rail which is preferably to be arranged vertically as subject matter and has a front wall provided with slots. For the removable hanging of furniture elements and panels, there are hook-in lugs thereon for engagement in slots selected according to the desired hanging height. Also disclosed is a contact device which, after plugging through the slots, produces an electrical connection between conductor rails, which are placed in the interior of the holding rail and extend in the longitudinal direction, and a consumer, which is situated outside the holding rail. The disadvantage here is that the current cannot be tapped off at any desired point along the entire axial extent, since the contact device can be positioned in each case only in one slot. The slotted grid which is situated at the front and of which most of the slots have to remain unoccupied, even at maximum load, is visually conspicuous, and given its relatively rough structure, is therefore not suitable for all aesthetic requirements, such as, for example, for presenting delicate lingerie.

OBJECT OF THE INVENTION

In view of the imperfections of previous rail profiles for the field of use here, the invention is based on the object of providing a current-conducting rail profile with a claim to being highly creative, at which current can be tapped over the entire axial extent by means of an adaptor which can be plugged in and displaced longitudinally.

A further object is to make it possible, in a constructively expanded variant of the rail profile, in addition to the delivery of current at the same time to hook in conventional brackets in order to secure variously configured supports for goods. Using rail profiles of both variants, more complex presentation devices are to be able to be constructed and fitted in accordance with individual requirements.

OVERVIEW OF THE INVENTION

The rail profile intended for fastening to a supporting structure and for the construction of presentation devices is provided in a simpler first and an expanded second variant. The rail profile has arranged within it a conductor rail which is supplied via a power supply and has conductors partially embedded in an insulation profile. The rail profile has a passage which extends from the front entry, runs continuously at least substantially along the rail profile, ends at a back strut and permits the engagement of an adaptor for the conductor rail to the conductors—in a freely selectable position in order to supply a consumer, which can be connected via a supply line. The rail profile is provided for vertical installation in the supporting structure when installed, in principle only the passage which emerges through a groove in the supporting structure being visible from the front side of the supporting structure.

The features below relate to special embodiments of the rail profile which apply first of all for the first and the second variant together: the entry into the gap-shaped passage is flanked by a left and a right access strut which extends in each case as far as a left or right wing strip which branch off at an angle and are intended for placing on the rear side of the supporting structure. Each access strut is continued behind the associated wing strip in the direction of the back struts as a left or right flank strut. One of the flank struts is offset to the outside, thus producing space for accommodating the conductor rail. The access struts are provided toward the front side of the supporting structure, at their free ends, in each case with a bent-over portion as edge protection and edge border. There are holes for fastening elements—primarily screws—which are screwed into the rear side of the supporting structure, in the wing strips.

The space for accommodating the conductor rail is formed from two adjacent groove profiles which are separated from each other by a central web which branches off from the adjacent flank strut into the interior of the rail profile. This clearance has profilings for accommodating the conductor rail, on which complementary outer contours of the insulation profile are supported. On the back strut there is an inwardly facing, raised molding as electrical grounding contact for the engaging adaptor. The conductor rail comprises the insulation profile, which in principle has a meandering cross section, and current-carrying wires which are accommodated in wire grooves and can be tapped off at least virtually over the entire axial extent of the current-carrying wires via groove-shaped access points. When inserted, the insulation profile comes to lie in the two groove profiles in a manner surrounding the central web, as a result of which the access points to the current-carrying wires, which are set back in relation to the passage, in principle open perpendicularly to the passage. The two access points open on one side of the insulation profile while the two current-carrying wires are embedded on the other side of the insulation profile. Grooves are mounted on both sides within and upstream of the back strut, for engagement of a lock of the adaptor. The grooves are formed by the back strut and by strut sections bounding the grooves laterally and toward the mouth of the passage.

The rail profile is advantageously produced as an aluminum extruded profile while the conductor rail is preferably produced as a plastic extruded profile.

The special characteristics of the rail profile of the second variant comprise a grid of grooves for accommodating hook-in lugs of hooked-in brackets being provided in the back strut. The brackets can be hooked in from the front side of the supporting structure, in a manner protruding through the passage. Two extensions which are spaced apart from each other run from the back strut in the opposite direction to the mouth of the passage and in between form a back groove into which the hook-in lugs of hooked-in brackets protrude. An outwardly pointing outer wing is attached to each extension, as a result of which the left and right wing strip and the left and right outer wing in each case lie parallel to one another. In the outer wings there are holes for fastening elements—primarily screws—which are screwed into a supporting framework or a building part to mount the rail profile.

In a simplified manner, the rail profile of the second variant can be fastened by screwing the wing strips on the rear side of the panel. As an alternative, holding clips are fixed opposite one another in pairs on the rear side of a supporting structure formed by a panel. A holding clip comprises a vertical limb, placed on the rear side, and tongues which are angled from the upper and lower end of the vertical limb and, bent at right angles to the rear side of the panel, leave a gap, corresponding to the material thickness of the wing strips. The tongues are arranged at the spacing of systematic recesses present on the wing strips, so that a panel provided with holding clips can be hung after the tongues are pushed through the recesses and lowered behind the wing strips. The holding clips are preferably attached on the rear side of the panel by means of screws.

The adaptor which is equally to be used for the first and the second variant of the rail profile first of all comprises a rotatable spindle and pivotable contact lugs sitting thereon for current collection from the current-carrying wires. A grounding contact of the adaptor is intended for placing on the molding. A locking element which can be displaced with the rotation of the spindle engages in the locked state—in this case the contact lugs are on the current-carrying wires—in the grooves on the rail profile, so that the adaptor can only be pulled out or pushed into the passage if the tapping off of current is interrupted or has not yet been produced—the contact lugs are then removed from the current-carrying wires.

A complex presentation device erected using the rail profiles of the first and second variant has the following characteristics: a multiplicity of vertically arranged rail profiles is inserted into a supporting structure which can be assembled from a plurality of panels which stand in one or different vertical planes. The rail profiles are fitted in a defined grid from each other, with rail profiles of the second variant—with the additional grooves for the hooking-in of brackets—and optionally at least one rail profile of the first variant—without such grooves, i.e. only for supplying current—being used. It is also possible as an alternative for there to be attached to a bracket, for example:

- a supporting arm protruding into the room, for the direct hanging of objects, for example items of clothing on hangers; or
- a supporting arm protruding into the room, for the securing of a transversely running front bar which is supported by at least one further such supporting arm whose bracket engages in an adjacent rail profile; or
- a supporting arm protruding into the room, for securing a shelf which is supported by at least one further such supporting arm whose bracket engages in an adjacent rail profile; or
- a transverse support arranged in the vicinity of the front side, for securing a slip-on arm protruding into the room, the transverse support being supported by at least one further bracket which is hooked into an adjacent rail profile.

At least one electrical consumer, for example a light fitted under a shelf, is supplied by the rail profile of the first variant, which only conducts current, via an adaptor which can be plugged into the rail profile in a freely selectable position.

BRIEF DESCRIPTION OF THE APPENDED DRAWINGS

In the drawings:

FIG. 1B shows the construction according to FIG. 1A, in a side view;

FIG. 1C shows the enlarged detail X1 from FIG. 1B;

FIG. 3A shows the upper end of a conductor rail, in a perspective view;

FIG. 3B shows a horizontal section on the line B-B in FIG. 3A;

FIG. 3C shows the conductor rail according to FIG. 3A inserted into the rail profile of the first variant according to FIG. 2A, in a perspective view;

FIG. 4A shows a rail profile of the second variant, in a perspective view;

FIG. 4B shows the rail profile of the second variant according to FIG. 4A, in a front view from the front;

FIG. 8A shows a rail profile of the second variant with a conductor rail according to FIG. 5A inserted into a panel element, with an adaptor plugged in, in a perspective front view;

FIG. 8B shows the arrangement according to FIG. 8A, with holding clips, in a perspective rear view;

FIG. 9C shows a horizontal section on the line F-F in FIG. 9A, over the course of the rail profile of the second variant;

FIG. 9D shows a horizontal section on the line G-G in FIG. 9A, closely above the plugged in adaptor.

EXEMPLARY EMBODIMENT

The detailed description of an exemplary embodiment for both variants of the rail profile according to the invention in various ways of fitting it and installed in a complex presentation device follows below.

The following statement applies to the whole of the rest of the description. If reference numbers are contained in a figure for the purpose of graphical unambiguity, but are not explained in the directly associated text of the description, then reference is made to where they are explained in the preceding or following descriptions of the figures. In the interests of clarity, the repeated designation of components in further figures is generally omitted if it can be graphically unambiguously seen that these involve "repeating" components.

Figure 1A:
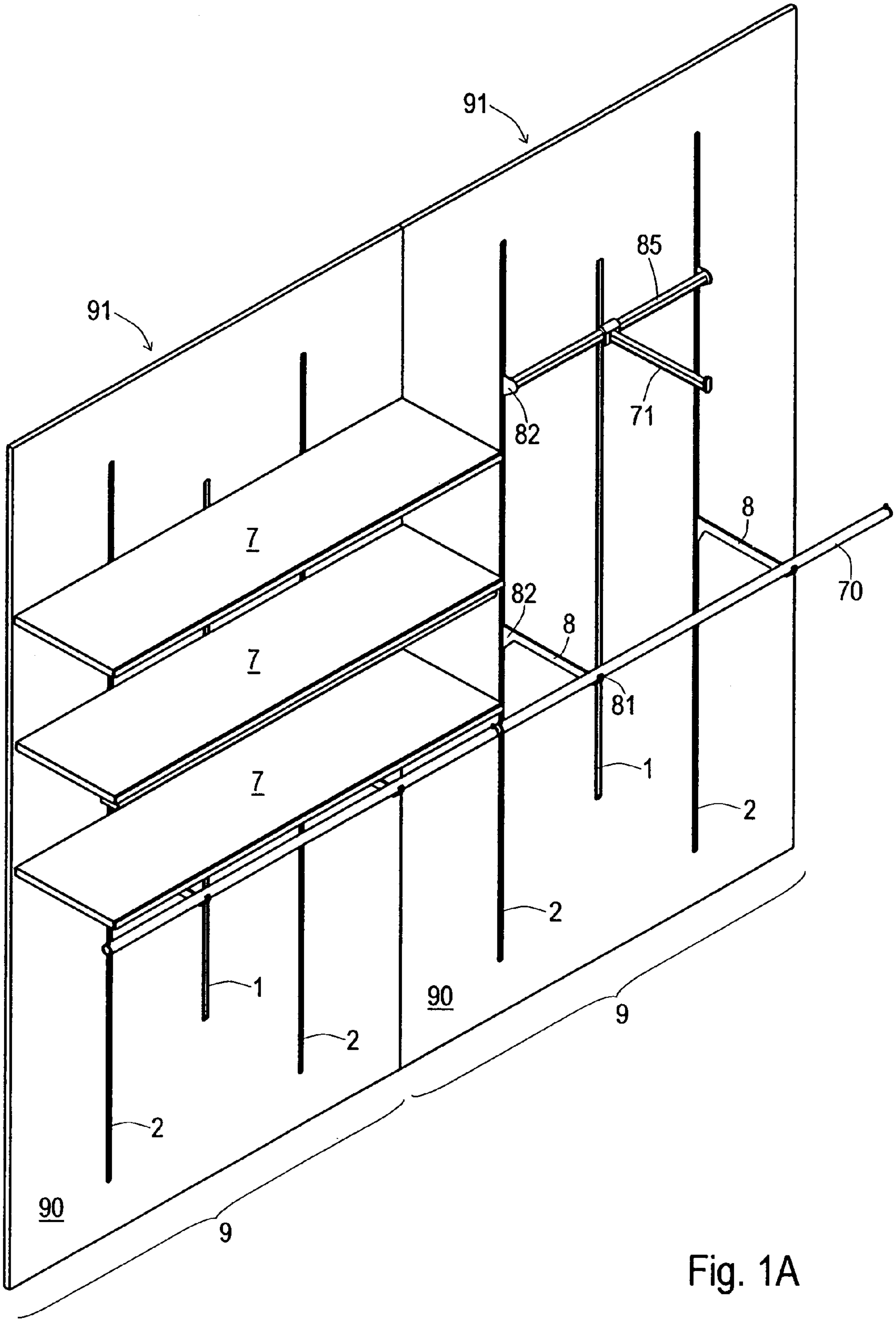
FIG. 1A shows two panel elements which are joined to one another in a wall plane with rail profiles of the first variant, which only conducts current, and of the second variant which can also be used as a securing means, with hooked-in supporting arms which support a shelf, a transverse bar and a slip-on arm, in a perspective front view.

FIGS. 1A to 1C

Figure 8C:
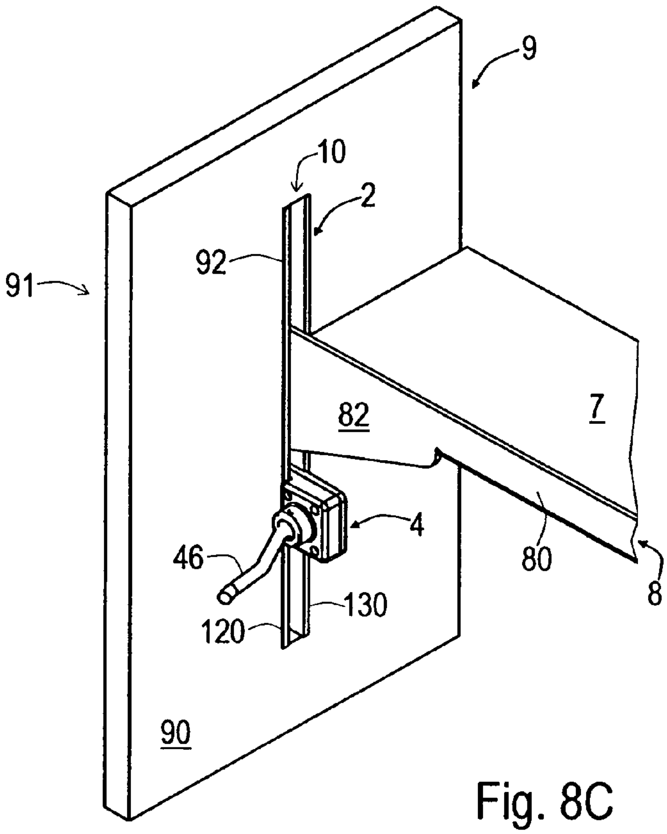
FIG. 8C shows the arrangement according to FIG. 8A with a supporting arm hooked in and a shelf supported thereby, in a perspective front view.

Four rail profiles 2 of the second variant and two rail profiles 1 of the first variant are inserted vertically, parallel to one another, into two panels 9,9, which are joined together to form a rectangular, vertical wall, which rail profiles, in a manner advantageous creatively, extend symmetrically with respect to the horizontal center line of the wall over a large part of the height of the wall. The fastening of the rail profiles 1,2 takes place from the rear side 91 (see in particular FIGS. 6B and 8B). Brackets 82, to which are attached supporting arms 8 which protrude away from the front sides 90 into the room, are inserted into the rail profiles 2 of the second variant. The shelf 7 and the front bar 70 rest in each case on a horizontal series of at least two supporting arms 8 which are inserted in each case into mutually adjacent rail profiles 2 of the second variant. The transverse support 85, which extends horizontally and in the vicinity of the front side 90 of the panel element 9 between a pair of brackets 82,82, serves for the hooking-in of a displaceable slip-on arm 71 which can be positioned as desired along the transverse support 85.

The rear sides of the rail profiles 1,2 protrude outward from the rear side 91 of the panel 9. From the front side 90 of the panel 9, the supporting arms 8 are plugged into the rail profile 2 of the second variant with the aid of upper and lower hook-in lugs 83,84 attached to the brackets 82. The supporting arms 8, which are intended for supporting the front bar 70, have, at their respective free ends of the bar parts 80, front portions 81 which comprise upwardly opening forks and engage under the front bar 70 over more than half of its circumference, with the result that the front bar 70 is upwardly secured. The shelves 7 are connected to the supporting arms 8 by means of tongue-and-groove connections. Below the central shelf 7 and above the upper supporting arm 8, a respective adaptor 4 is plugged into the rail profile 2 of the second variant. A supply line 46,78 runs from the lower adaptor 4 to the light 79.

Figure 2A:
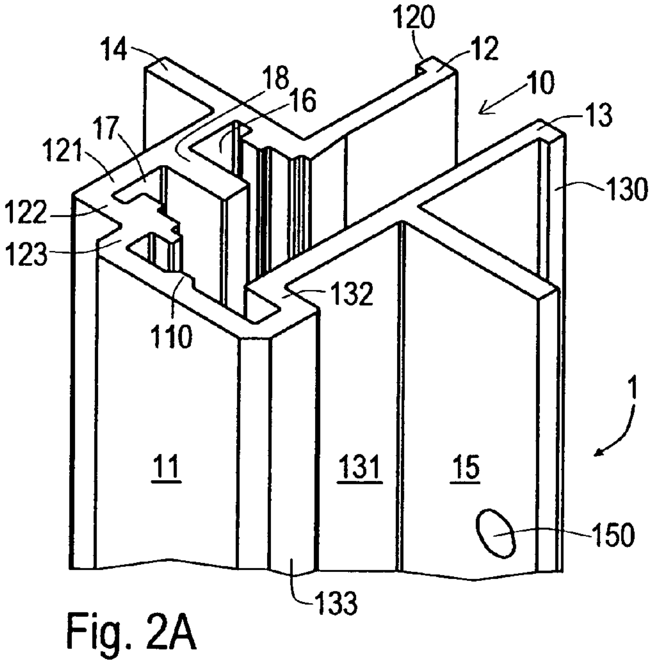
FIG. 2A shows the upper end of a rail profile of the first variant, in a perspective view.
Figure 2B:
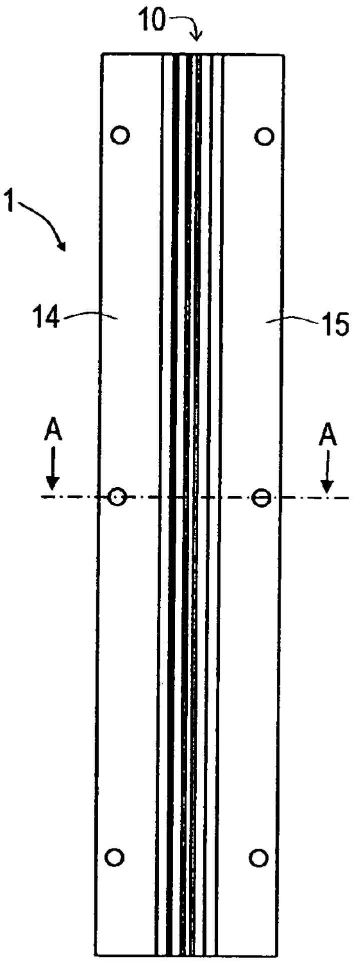
FIG. 2B shows an entire rail profile of the first variant according to FIG. 2A, in a front view from the front.
Figure 2C:
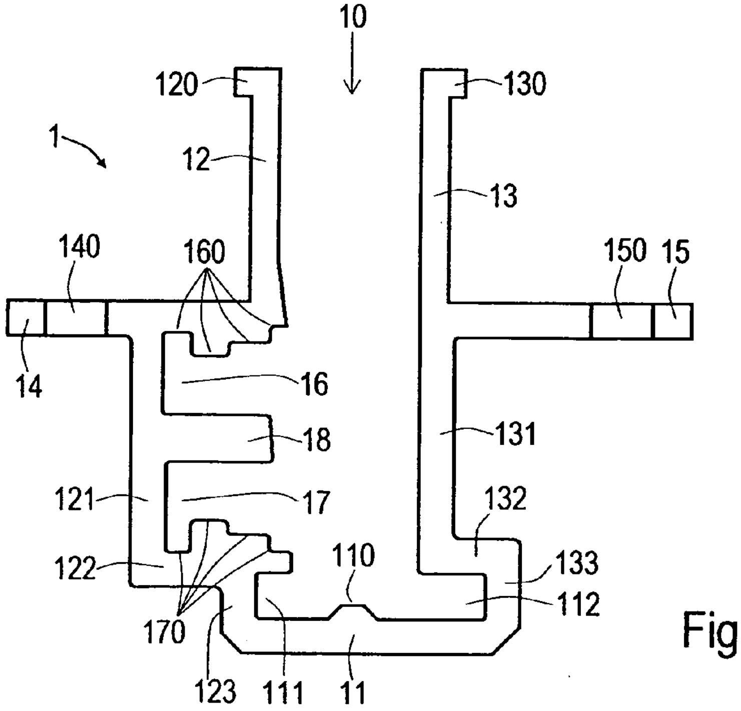
FIG. 2C shows a horizontal section on the line A-A in FIG. 2B.
Figure 4C:
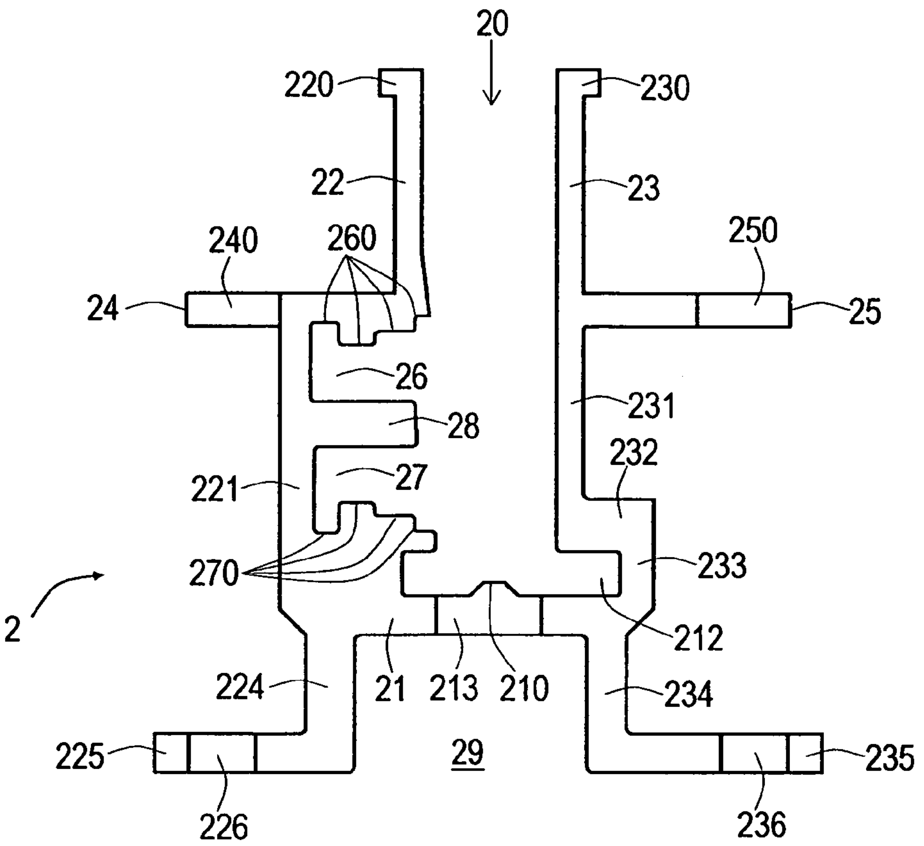
FIG. 4C shows a horizontal section on the line C-C in FIG. 4B.
Figure 5B:
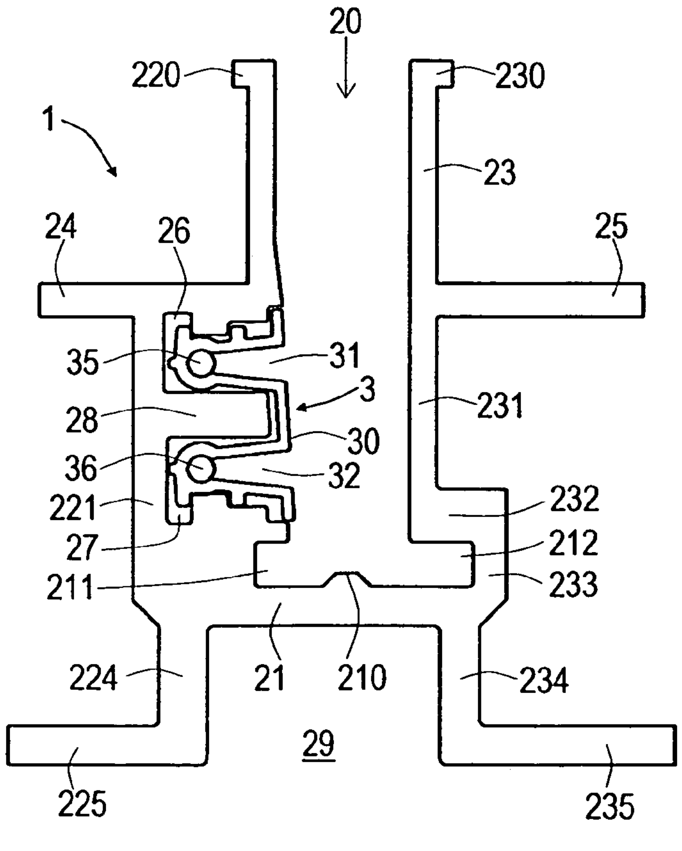
FIG. 5B shows a horizontal section on the line D-D in FIG. 5A.
Figure 5A:
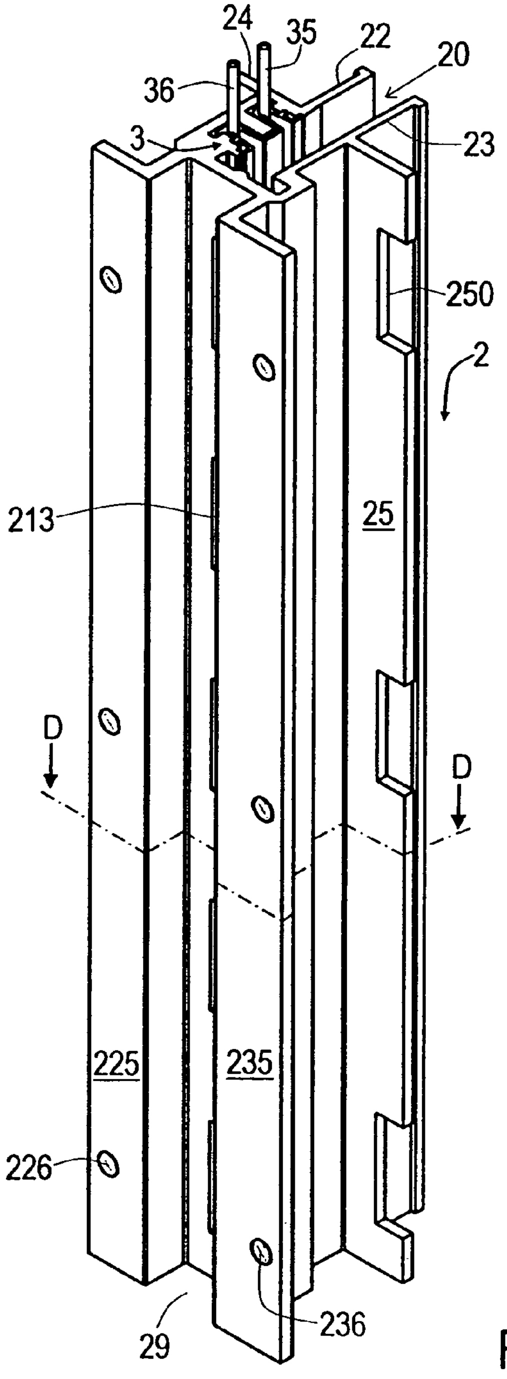
FIG. 5A shows the conductor rail according to FIG. 3A inserted into the rail profile of the second variant according to FIG. 4A, in a perspective view.

FIGS. 2A to 2C

The rail profile 1 of the first variant has a constant cross section over its entire length. The left access strut 12 tapering to the front side of the profile and the right access strut 13 form in between an open passage 10. At the entry into the passage 10, the access struts 12,13 are angled to form bent-over portions 120,130 which point in opposite directions and serve as edge protection and edge border. The front surfaces of the bent-over portions 120,130, against which the housing 40 of a displaceable adaptor 4 plugged into the rail profile 1 butts (see FIG. 7B) lie in a common plane.

The left access strut 12 merges to the left into a left wing strip 14. A left flank strut 121 is attached vertically approximately in the center of the wing strip 14, thus resulting in a T-shaped cross section, and the left wing strip 14 with the left flank strut 121 forming an adjoining space which branches off vertically from the passage 10 and is bounded to the rear by a left transverse strip 122. In the interior of the adjoining space, a central web 18 rises from the inside of the left flank strut 121 and divides the adjoining space into a first groove profile 16 and a second groove profile 17. The two groove profiles 16,17 have mutually mirror-inverted profilings 160,170 on which the complementary profile of a conductor rail 3 is supported. The central web 18 supports the conductor rail 3 and therefore provides an additional means of securing against deformation and ultimately a short circuit between the current-carrying wires 35,36 (see FIG. 3C). The left transverse strut 122 comes together at right angles with a left back strut 123 which, together with the left end of the back strut 11 and a lug of the profiling 170 that is situated parallel to the back strut 11, bounds a left groove 111. A right wing strip 15 which lies in a plane with the left wing strip 14 extends to the right perpendicularly to the right access strut 13. The holes 140,150 in the wing strips 14,15 serve to fasten the rail profile 1 on the rear side 91 of the panel 9. The right access strut 13 continues behind the right wing strip 15 as right flank strut 131 which merges shortly before reaching the back strut 11 to the right into a right transverse strut 132. The right transverse strut 132 bends off into a right back strut 133 and, together with the latter and the right end of the back strut 11, forms a right groove 112. A molding 110 rises centrally from the inside of the back strut 11 and is intended for tapping off a grounding contact 44 for the adaptor 4 (see FIG. 7B).

FIGS. 3A to 3C

The conductor rail 3 comprises an insulation profile 30, a first current-carrying wire 35 guided in a first wire groove 33 and a second current-carrying wire 36 guided in a second wire groove 34. The two current-carrying wires 35,36 lie in a common plane running parallel to the access struts 12,13 and can be tapped off via access points 31,32 over the entire axial extent of the conductor rail 3. The insulation profile 30 has in principle an M-shaped or meandering cross section. In each case one M limb of the insulation profile 30 is arranged in each case in one of the groove profiles 16,17 branching off from the passage 10, and the central web 18 is surrounded by that central part of the insulation profile 30 which is open to the flank strut 121 in the inserted state. The insulation profile 30 of the conductor rail 3 has outer contours 37 which fit into the complementary inner contours 160,170 on the groove profiles 16,17. The access points 31,32 open perpendicularly to the passage 10. The wire grooves 33,34 and the current-carrying wires, 35,36, which are guided therein and are preferably round in cross section, are situated in each case in the tips of the M-limbs.

FIGS. 4A to 5B

The rail profile 2 of the second variant with the passage 20 is an expansion of the rail profile 1 of the first variant and therefore has numerous common features. The back strut 21 with the molding 210 and the grooves 211,212 situated on both sides thereof, the left and right access struts 22,23 with the front bent-over portions 220,230, the left and right wing strips 24,25, the two groove profiles 26, 27 with the inner profilings 260,270 and the dividing central web 28 are once again present. There is likewise the left and right flank struts 221,231 and the right transverse strut 232 and the right back strut 233. In the same manner as in the case of the rail profile 1 of the first variant, the identical conductor rail 3 with the insulation profile 30, the two access points 31,32, wire grooves 33,34 and current-carrying wires 35,36 is also inserted into the rail profile 2 of the second variant.

Situated on the longitudinal center line of the back strut 21 is a grid of grooves 213 into which the hook-in lugs 83,84 of the brackets 82, which lugs are brought up through the passage 20, can be hooked. A respective extension 224,234 extends vertically to the rear on both sides of the back strut 21. The back strut 21 and the two extensions 224,234 form a U-shaped back groove 29 which provides space for the hook-in lugs 83,84 hooked into the grooves 213. The left extension 224 merges vertically to the left into a left outer wing 225 and the right extension 234 merges to the right into a right outer wing 235. At a systematic spacing in the wing strips 24,25 there are respective recesses 240,250 which are open toward the outer edge. The outer wings 225,235 have holes 226,236 for fastening the rail profile 2, for example, to a rear wall of a building or to a support.

Figure 6C:
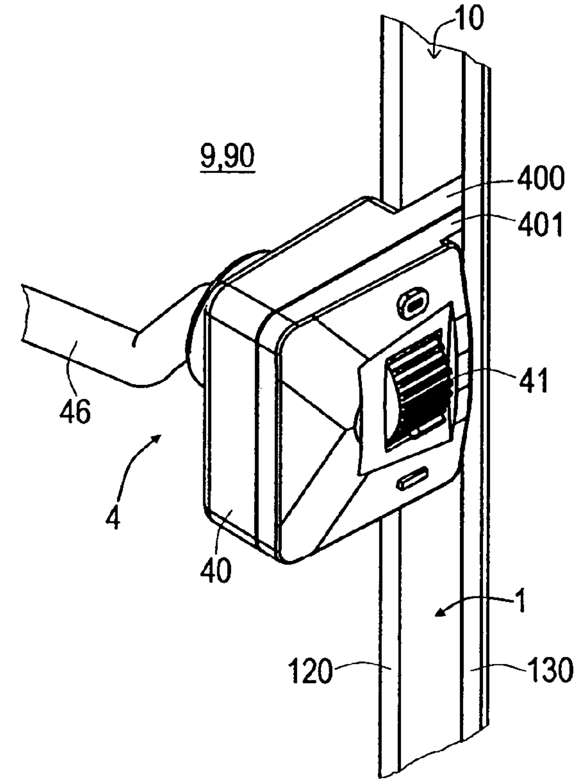
FIG. 6C shows the enlarged detail X2 from FIG. 6A.
Figure 6A:
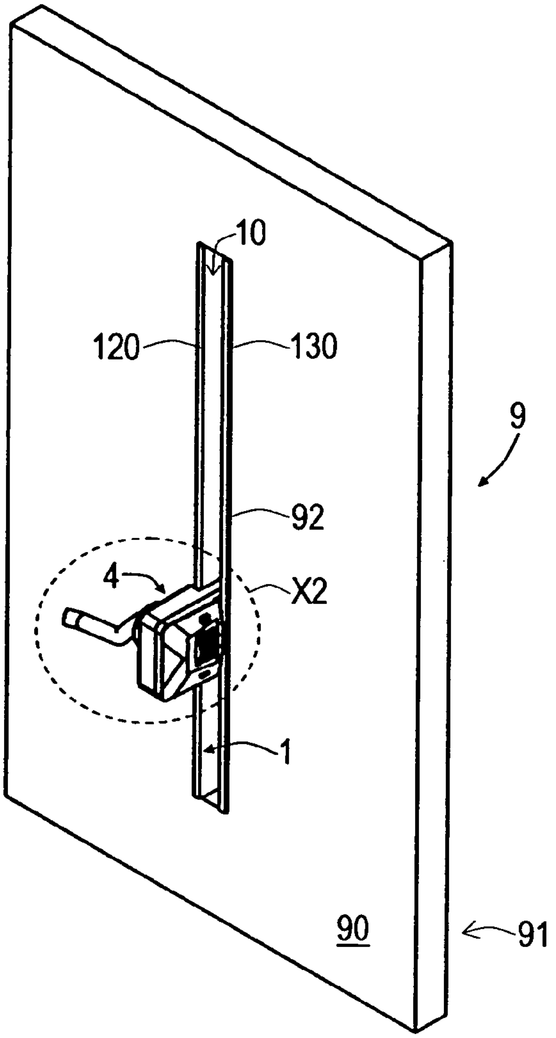
FIG. 6A shows a rail profile of the first variant with a conductor rail according to FIG. 3C inserted into a panel element, with an adaptor plugged in, in a perspective front view.
Figure 6B:
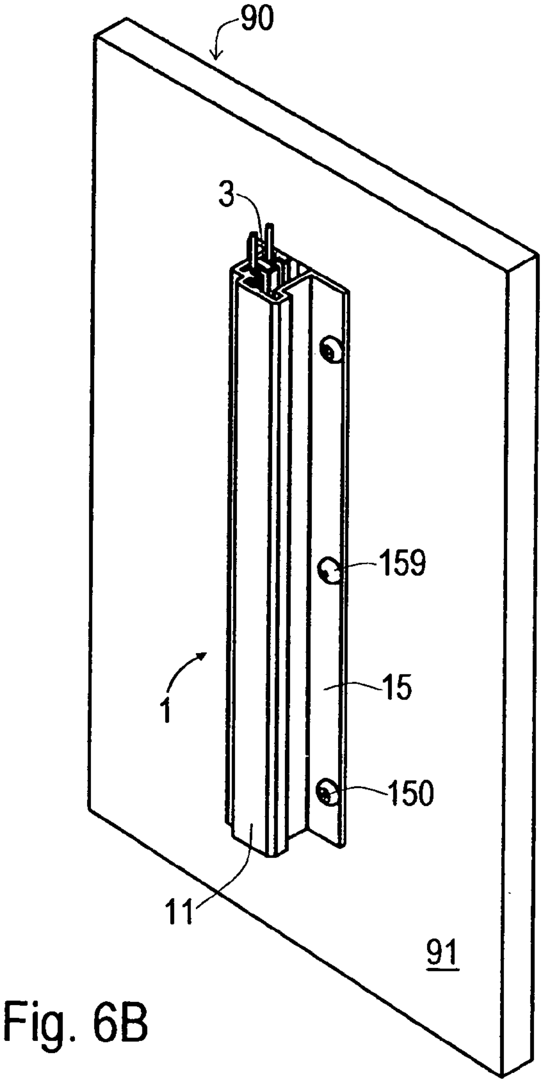
FIG. 6B shows the arrangement according to FIG. 6A, in a perspective rear view.

FIGS. 6A to 6C

In order to insert the rail profile 1 of the first variant into the panel 9, the access struts 12,13 are guided from the rear side 91 of the panel 9 through a groove 92 as far as the wing strips 14,15. The groove 92 is provided in identical length to the rail profile 1 and its width is intended to correspond with as little play as possible to the span between the outer ends of the two bent-over portions 120,130. The wing strips 14,15 rest on the rear side 91 of the panel 9 and are fastened by means of screws 149,159 protruding through the holes 140,150 (also see FIG. 7B). The bent-over portions 120,130 advantageously protrude forwards somewhat beyond the plane of the front side 90 of the panel 9. The conductor rail 3 is situated in principle behind the panel 9 and therefore permits an easily accessible power supply. The adaptor 4 can be pushed to some extent together with the back and front plates 400,401 belonging to the housing 40 into the passage 10 from the front side 90 of the panel 9. The housing 40 has angled stops on both sides which limit the push-in depth and guide the adaptor 4 in a laterally stable manner during displacement along the rail profile 1.

Figure 7A:
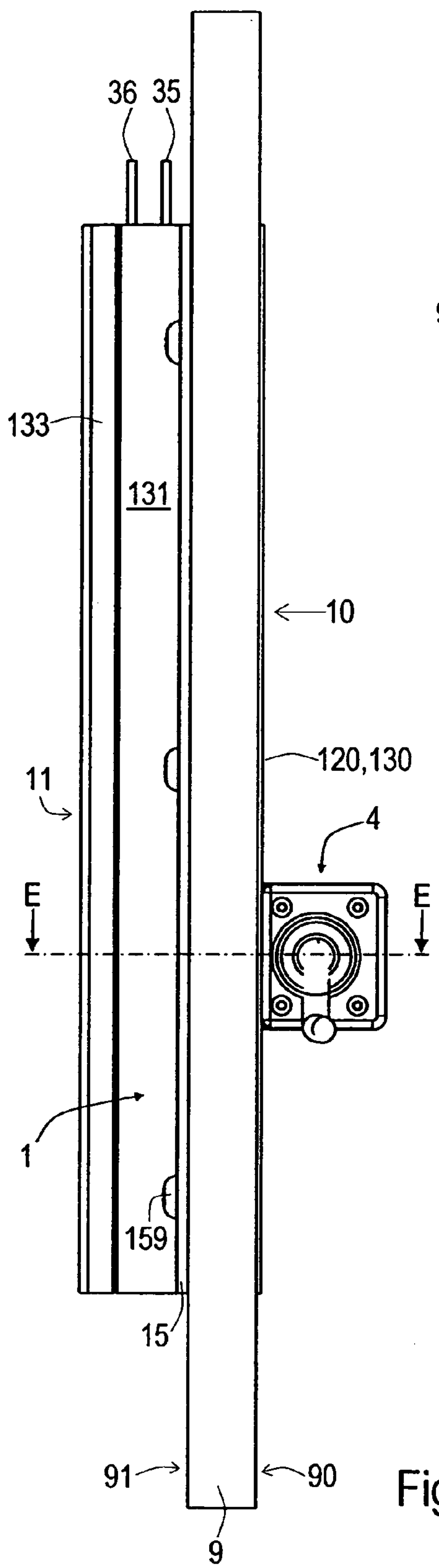
FIG. 7A shows the arrangement according to FIG. 6A, in a side view.
Figure 7B:
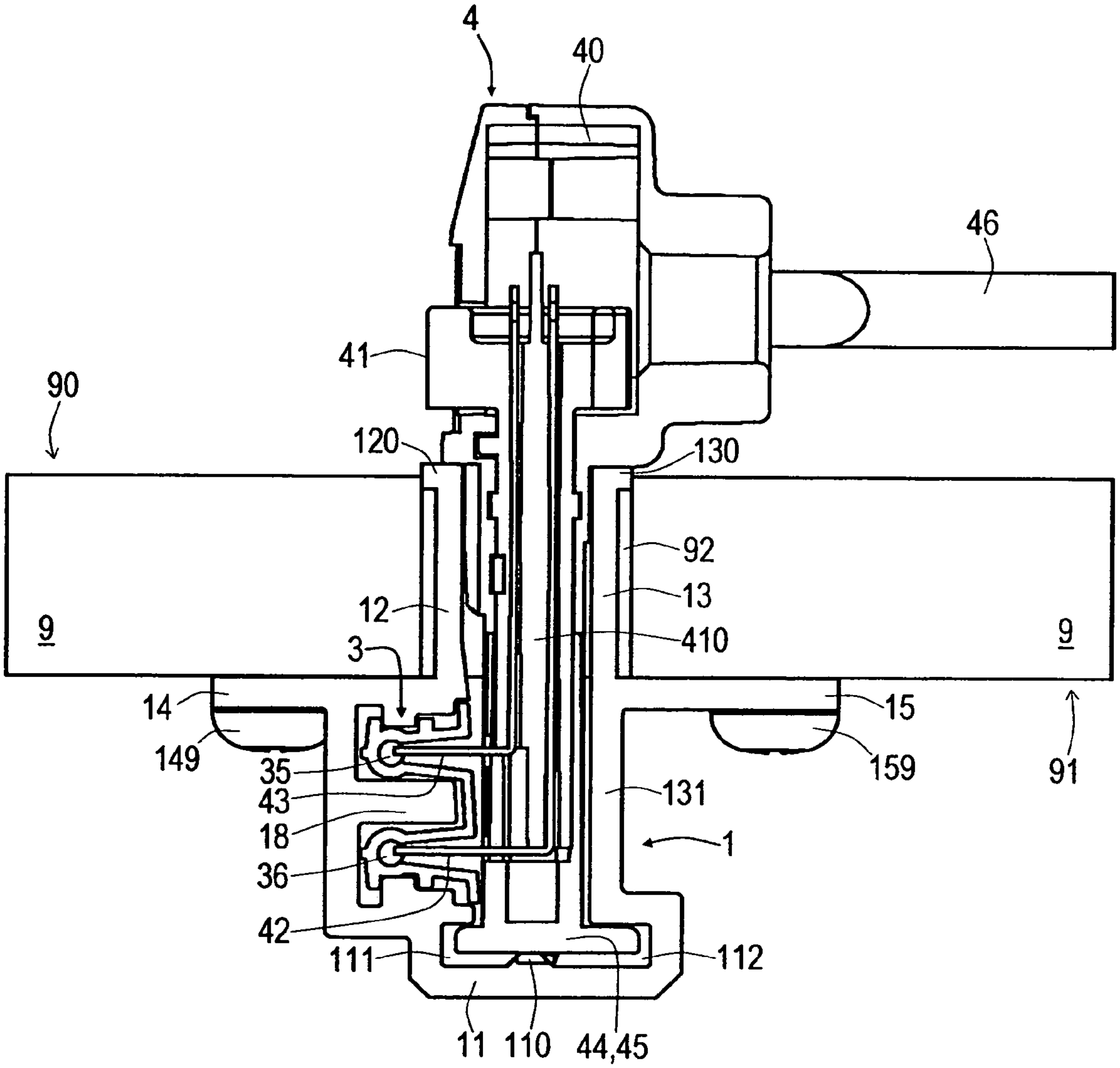
FIG. 7B shows an enlarged horizontal section on the line E-E in FIG. 7A.
Figure 9A:
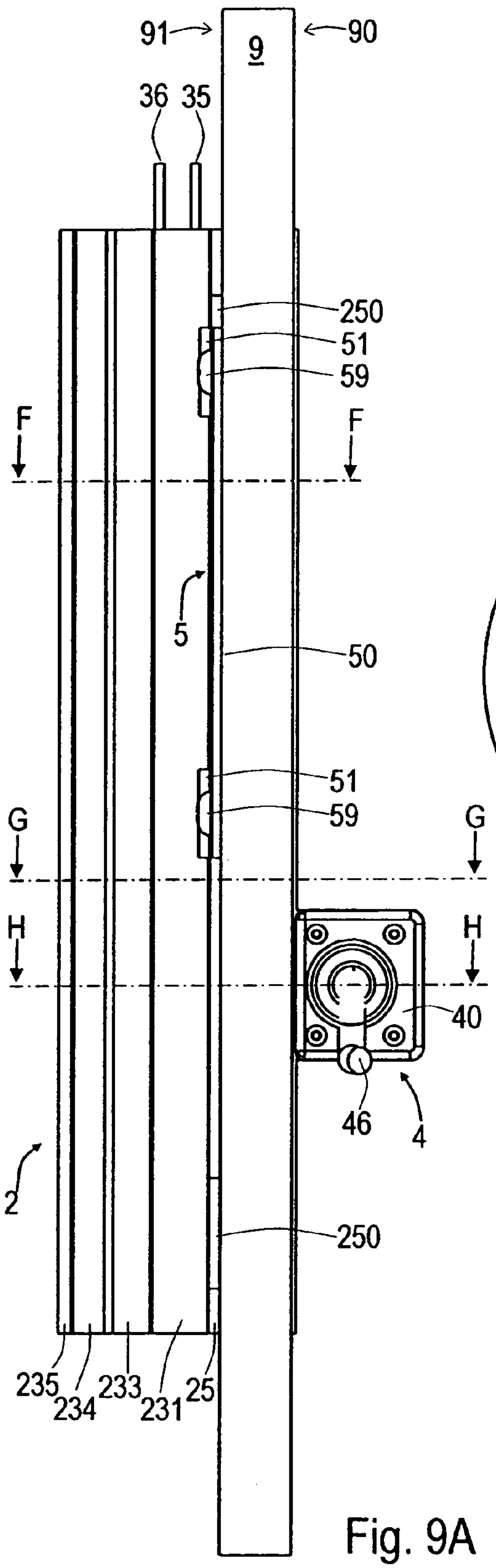
FIG. 9A shows the arrangement according to FIG. 8A, in a side view.
Figure 9B:
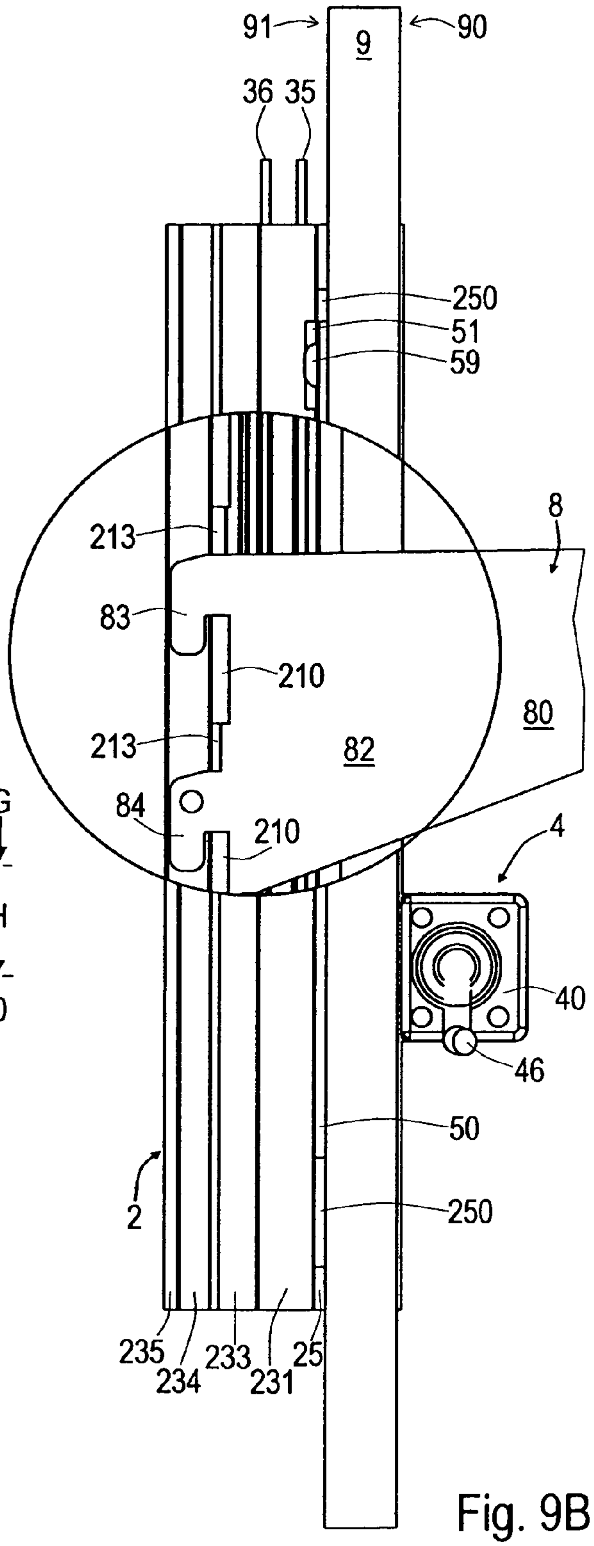
FIG. 9B shows the arrangement according to FIG. 8C, with an enlarged sectional view of the hooked-in supporting arm, but without a shelf, in a side view.
Figure 9E:
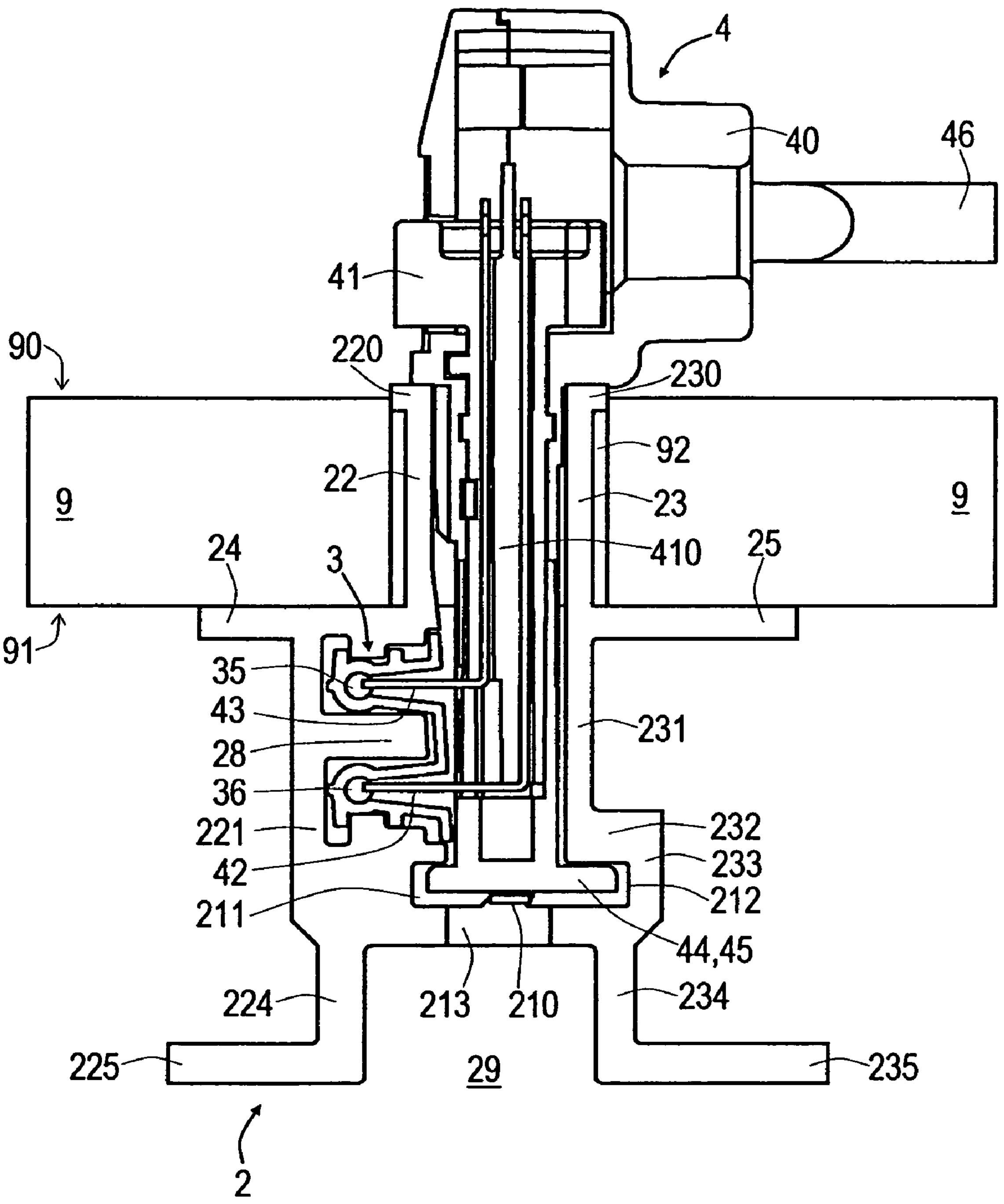
FIG. 9E shows a horizontal section on the line H-H in FIG. 9A, centrally through the plugged in adaptor.

FIGS. 7A and 7B

The adaptor 4 is described as an accessory subject matter of WO 03/070 060 A1 and is therefore described there in detail, with the result that its basic handling is sufficient here. The adaptor 4 essentially comprises a housing 40 with a back plate 400, a front plate 401 and a rotary knob 41 which is accessible to the user and is connected to a spindle 410 extending for the most part within the housing 40. Within the spindle 410, two conductors of different length run axially parallel to each other and, at their rear ends, are bent over at right angles to form a front contact lug 42 and to form a rear contact lug 43 and protrude radially out of the spindle 410. A latch 45 is fastened transversely at the rear end of the spindle 410, which end protrudes outward out of the housing 40. Displacement of the rotary knob 41 causes the spindle 410 to rotate and the contact lugs 42,43 connected to it and the latch 45 to pivot. When the adaptor 4 is pushed into the passage 10 of the rail profile 1, the contact lugs 42,43 and the latch 45 have in principle to be aligned axially to the rail profile 1 and conductor rail 3, for example have to point upward. In this position, the contact lugs 42,43 are completely pivoted into the housing 40. After the adaptor 4 has been completely pushed in, the latch 45 bears against the molding 110. Then, by displacement of the rotary knob 41, the contact lugs 42,43 are rotated through 90° out of slots in the housing 40 and in the process pivot into the groove profiles 16,17, the contact lugs 42,43 finally being situated horizontally in the groove profiles 16,17 and bearing against the current-carrying wires 35,36. As a consequence of the rotation, the outer ends of the latch 45 engage in the left and right grooves 111,112. The latch 45 therefore prevents the adaptor 4 from being pulled out of the rail profile 1 and the grounding contact 44, which bears against the molding 110, from being interrupted when current is being tapped off.

FIGS. 8A to 9E

In this sequence of figures, the rail profile 2 of the second variant is inserted into a panel 9 and an adaptor 4 inserted into the passage 20 and a bracket 82 hooked in through the passage 20 are illustrated. At the same time, the releasable fastening of the panel 9 to the rail profile 2 by the holding clips 5 attached on the rear side is illustrated. In the hooked-in state, the brackets 82, which can continue in a manner directed into the room as a bar part 80 and forms a supporting arm 8, protrudes through the passage 20. After the inserted bracket 82 is lowered, the two downwardly directed hook-in lugs 83,84 engage behind the wall edge in the back strut 21 under the grooves 213 selected at the desired hook-in height. The protruding hook-in lugs 83,84 find space in the back groove 29 formed between the two extensions 224,234.

Holding clips 5 are fastened lying opposite each other in pairs on the rear side 91 of a supporting structure 9 formed by a panel. The individual holding clip 5 comprises a vertical limb 50, which is placed directly on the rear side 91, and tongues 51 which are angled from the upper and lower end of the vertical limb 50 and, bent at right angles to the rear side 91, leave a gap, corresponding to the material thickness of the wing strips 24,25. The tongues 51 of a pair of holding clips 5 are directed towards each other and are at a vertical distance in a manner complementary to the recesses 240,250 in the wing strips 24,25. The panel 9 provided with holding clips 5 can therefore be hung after the tongues 51 are pushed through the recesses 240,250 and lowered behind the wing strips 24,25. The holding clips 5 are fastened on the rear side 91 of the panel 9 by means of screws 59. In a simplified form, the rail profile 2 situated with its access struts 22, 23 in the groove 92 present in the panel 9 could also be fastened, instead of by the holding clips 5, by screwing the wing strips 24,25 on the rear side 91 of the panel 9.

The adaptor 4 previously used in the case of the rail profile 1 of the first variant was likewise used for the rail profile 2 of the second variant. The access of the adaptor 4 to the conductor rail 3 is identical in both rail profiles 1,2, and so the explanation to FIG. 7 applies analogously to FIGS. 9D and 9E.

The invention claimed is:

1. A rail profile (1,2) and presentation device produced therewith, the rail profile (1,2):

a) being intended to be fastened to a supporting structure (9);

b) having arranged within it a conductor rail (3) which is supplied via a power supply and has conductors (35,36) partially embedded in an insulation profile (30);

c) having a passage (10,20) which extends from the front entry into the profile rail (1,2), runs continuously at least substantially along the rail profile (1,2), ends at a back strut (11,21) and permits the engagement of an adaptor (4) for the conductor rail (3) to the conductors (35,36) in a freely selectable position in order to supply a consumer (79), which is adapted to be connected via a supply line (46,78);

d) wherein the rail profile (1,2) is provided for vertical installation in the supporting structure (9);

e) when installed, only the passage (10,20) which emerges through a groove (92) in the supporting structure (9) is visible from the front side (90) of the supporting structure (9);

f) wherein the entry into the gap-shaped passage (10,20) is flanked by a left and a right access strut (12,13;22,23) which extends in each case as far as a left or right wing strip (14,15;24,25) which branches off at an angle and is intended for placing on the rear side (91) of the supporting structure (9);

g) each access strut (12,13;22,23) is continued behind the associated wing strip (14,15;24,25) in the direction of the back struts (11,21) as a left or right flank strut (121,131;221,231); and h) one of the flank struts (121,221) is offset to the outside, thus producing space for accommodating the conductor rail (3).

2. The rail profile (1,2) as claimed in claim 1, wherein a) the access struts (12,13;22,23) are provided toward the front side (90) of the supporting structure (9), at their free ends, in each case with a bent-over portion (120, 130;220,230) as edge protection and edge border;

b) holes (140,150;240,250) for fastening elements, which are screwed into the rear side (91) of the supporting structure (9), are provided in the wing strips (14,15; 24,25);

c) the space for accommodating the conductor rail (3) is formed from two adjacent groove profiles (16,17;26, 27) which are separated from each other by a central web (18,28) which branches off from the adjacent flank strut (121,221) into the interior of the rail profile (1,2);

d) the space for accommodating the conductor rail (3) has profilings (160,170;260,270) on which complementary outer contours (37) of the insulation profile (30) are supported; and e) an inwardly facing, raised molding (110,210) as electrical grounding contact for the engaging adaptor (4) is provided on the back strut (11,21).

3. The rail profile (1,2) as claimed in claim 2, wherein a) the conductor rail (3) comprises the insulation profile (30), which has a meandering cross section, and current-carrying wires (35,36) which are accommodated in wire grooves (33,34) and are adapted to be tapped off at least virtually over the entire axial extent of the current-carrying wires (35,36) via groove-shaped access points (31,32);

b) when inserted, the insulation profile (30) comes to lie in the two groove profiles (16,17;26,27) in a manner surrounding the central web (18,28), as a result of which the access points (31,32) to the current-carrying wires (35,36), which are set back in relation to the passage (10,20), open perpendicularly to the passage (10,20);

c) the two access points (31,32) open on one side of the insulation profile (30) while the two current-carrying wires (35,36) are embedded on the other side of the insulation profile (30);

d) grooves (111,112;211,212) are mounted on both sides within and upstream of the back strut (11,21), for engagement of a lock (45) of the adaptor (4); and e) the grooves (111,112;211,212) are formed by the back strut (11,21) and by strut sections (122,123;132,133; 221 ;232,233) bounding the grooves (111,112; 211,212) laterally and toward the mouth of the passage (10,20).

4. The rail profile (2) as claimed in claim 1, wherein a) a grid of grooves (213) for accommodating hook-in lugs (83,84) of hooked-in brackets (82) is provided in the back strut (21); and b) the brackets (82) are adapted to be hooked in from the front side (90) of the supporting structure (9), in a manner protruding through the passage (20).

5. The rail profile (2) as claimed in claim 4, wherein a) two extensions (224,234) which are spaced apart from each other extend from the back strut (21) in the opposite direction to the mouth of the passage (20) and in between form a back groove (29) into which the hook-in lugs (83,84) of hooked-in brackets (82) protrude;

b) an outwardly pointing outer wing (225,235) is attached to each extension (224,234), as a result of which the left and right wing strip (24,25) and the left and right outer wing (225,235) in each case lie parallel to one another; and c) holes (226,236) for fastening elements, which are screwed into a supporting framework or a building part to mount the rail profile (2) are provided in the outer wings (225,235).

6. The rail profile (2) as claimed in claim 1 wherein a) holding clips (5) are fastened opposite one another in pairs on the rear side (91) of a supporting structure (9) formed by a panel;

b) a holding clip (5) comprises a vertical limb (50), placed on the rear side (91), and tongues (51) which are angled from the upper and lower end of the vertical limb (50) and, bent at right angles to the rear side (91), leave a gap, corresponding to the material thickness of the wing strips (24,25);

c) the tongues (51) are arranged at the spacing of systematic recesses (240,250) present on the wing strips (24,25);

d) a panel (9) provided with holding clips (5) is adapted to be hung therewith after the tongues (51) are pushed through the recesses (240,250) and lowered behind the wing strips (24,25);

e) the holding clips (5) being fastened on the rear side (91) of the panel (9) by means of screws (59).

7. The rail profile (1,2) as claimed in claim 1, wherein the adaptor (4) comprises:

a) a rotatable spindle (410);

b) pivotable contact lugs (42,43) on the rotatable spindle (410) for current collection from the current-carrying wires (35,36);

c) a grounding contact (44) placed on the molding (110, 210); and d) a locking element (45) which is adapted to be displaced with the rotation of the spindle (410) and, in the locked state where the contact lugs (42,43) lie on the current-carrying wires (35,36), engages in the grooves (111, 112;211,212) on the rail profile (1,2), so that the adaptor (4) is adapted to only be pulled out or pushed into the passage (10,20) if the tapping off of current is interrupted or has not yet been produced, the contact lugs (42,43) are removed from the current-carrying wires (35,36).

8. A presentation device produced with the rail profile (1,2) as claimed in claim 1, wherein a) a multiplicity of vertically arranged rail profiles (1,2) is inserted into a supporting structure (9) which is adapted to be assembled from a plurality of panels which stand in one or different vertical planes;

b) the rail profiles (1,2) are fitted in a defined grid from each other and, rail profiles (2) are provided with the additional grooves (213) for the hooking-in of brackets (82), and at least one rail profile (1) is provided without such grooves (213), c) attached to a bracket (82) is:

ca) a supporting arm (8) protruding into the room, for the direct hanging of objects; or cb) a supporting arm (8) protruding into the room, for the securing of a transversely running front bar (70) which is supported by at least one further such supporting arm (8) whose bracket (82) engages in an adjacent rail profile (2); or cc) a supporting arm (8) protruding into the room, for securing a shelf (7) which is supported by at least one further such supporting arm (8) whose bracket (82) engages in an adjacent rail profile (2); or cd) a transverse support (85) arranged in the vicinity of the front side (90), for securing a slip-on arm (71) protruding into the room, the transverse support (85) being supported by at least one further bracket (82) which is hooked into an adjacent rail profile (2); and d) at least one electrical consumer, which is fitted under a shelf (7), is supplied by the rail profile (1), which only conducts current, via an adaptor (4) which is adapted to be plugged into the rail profile (1) in a freely selectable position.

9. A rail profile (1,2) adapted to be fastened to a supporting structure (9) and sized and shaped to accommodate a conductor rail (3), the rail profile (1,2) comprising:

a left access strut (12, 22) and a right access strut (13, 23) positioned relative to the left access strut (12, 22) so as to form a passage (10, 20) between the left and right access struts (12, 13; 22, 23);

a left wing strip (14, 24) having a center, the left wing strip (14,24) extending from the left access strut (12,22) and positioned substantially perpendicular relative to the left access strut (12, 22);

a right wing strip (15, 25) extending from the right access strut (13, 23) and positioned substantially perpendicular relative to the right access strut (13, 23);

a left flank strut (121, 221) extending substantially from the center of the left wing strip (14, 24);

a right flank strut (131, 231) extending from the right wing strip (15, 25) and positioned substantially perpendicular relative to the right wing strip (15, 25); and a back strut (11, 21) extending between the left and right flank struts (121, 131; 221, 231), one of the flank struts (121, 221) being offset to form a space for accommodating the conductor rail (3).

* * * * *